(12) United States Patent
Singh et al.

(10) Patent No.: US 6,791,779 B1
(45) Date of Patent: Sep. 14, 2004

(54) DISK DRIVE HAVING A CONNECTION-BLOCKING DEVICE FOR USE WITH A SERIAL ADVANCED TECHNOLOGY ATTACHMENT (SATA) POWER RECEPTACLE

(75) Inventors: Dalwinder Singh, Irvine, CA (US); Marc B. Goldstone, Irvine, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 193 days.

(21) Appl. No.: 10/261,437

(22) Filed: Sep. 30, 2002

(51) Int. Cl.[7] .................................................. G11B 5/02
(52) U.S. Cl. ........................................................ 360/55
(58) Field of Search .......................... 360/55, 69; 710/8; 361/685, 785, 786, 787, 788, 789; 439/135

(56) References Cited

PUBLICATIONS

"Form Factor of 3.5"Disk Drives", Sep. 24, 2001, SFF Committee.
Serial ATA "High Speed Serialized AT Attachment"; Aug. 29, 2001; cover and pp. 44–47 and 288–290.

*Primary Examiner*—David Hudspeth
*Assistant Examiner*—Daniel L Negron
(74) *Attorney, Agent, or Firm*—Milad G. Shara, Esq.; Blakely Sokolof Taylor & Zafman (57) ABSTRACT

A disk drive having a connection-blocking device for use with a Serial Advanced Technology Attachment (SATA) power receptacle. The disk drive has a moveable head for writing and reading to and from a disk, a printed circuit board assembly (PCBA) for controlling operations in the disk drive, a Serial Advanced Technology Attachment (SATA) section attached to the PCBA having a SATA power receptacle and a SATA data receptacle, a legacy Integrated Drive Electronics (IDE) power receptacle attached to the PCBA, and a connection-blocking device. The legacy IDE power receptacle is electrically common with the SATA power receptacle. The connection-blocking device is attachable to either one of the SATA power receptacle or the legacy IDE power receptacle, respectively, to prevent redundant power connections within the disk drive.

31 Claims, 5 Drawing Sheets

DISK DRIVE HAVING A CONNECTION-BLOCKING DEVICE FOR USE WITH A SERIAL ADVANCED TECHNOLOGY ATTACHMENT (SATA) POWER RECEPTACLE

BACKGROUND OF THE INVENTION

1. Field of the Invention

The present invention relates to disk drives. More particularly, the present invention relates to a disk drive having a connection-blocking device for use with a Serial Advanced Technology Attachment (SATA) power receptacle.

2. Description of the Prior Art and Related Information

Computer systems today rely on rotating media storage devices (RMSDs), which often employ a moveable head actuator to frequently access large amounts of data stored on a media, such as a rotating disk. One example of such an RMSD is a hard disk drive.

Disk drives are typically connected to a host computer through a host bus connector for the transfer of commands, status and data. Today, disk drives are being designed to comply with the Serial Advanced Technology Attachment (SATA) standard, presently favored for newer desktop personal computers, as well to support the older Parallel ATA standard. Thus, newer disk drives may include both Serial ATA (SATA) power connectors, as well as parallel ATA power connectors (hereinafter referred to as legacy Integrated Drive Electronics (IDE) connectors). In this way with respect to power connections, host computers can support disk drives utilizing either the newer SATA standard power connector or the legacy IDE power connector.

A problem with disk drives that support both the legacy IDE power connectors and SATA power connectors is that redundant power connections to the printed circuit board assembly (PCBA) of the disk drive are simultaneously provided. Unfortunately, redundant power connections provide the opportunity for potential problems to occur.

For example, if a user of the disk drive makes power connections to both the legacy IDE power pins of the legacy IDE power connector and to the power contact pins of the SATA power connector, ground loops and noise may be introduced into the PCBA of the disk drive, seriously degrading disk drive performance, and may even result in the disk drive becoming non-functional. Otherwise when only one of the connectors is used, the power pins of the respective non-utilized legacy IDE power connector or SATA power connector are exposed-presenting a risk that the power pins of the non-utilized power connector may possibly short to metal structures in the computer system causing potential operational problems to the disk drive. Additionally, users may attempt to draw power from the disk drive through the non-utilized legacy IDE power connector or SATA power connector to power other electronic devices. This of course may drain power from the disk drive and may degrade the performance of the disk drive.

SUMMARY OF THE INVENTION

The present invention relates to a disk drive having a connection-blocking device for use with a Serial Advanced Technology Attachment (SATA) power receptacle.

In one aspect, the invention may be regarded as a disk drive having redundant power connections, in which the disk drive includes a disk for rotation within the disk drive, a moveable head for writing and reading to and from the disk, a printed circuit board assembly (PCBA) for controlling operations in the disk drive, a Serial Advanced Technology Attachment (SATA) section attached to the PCBA having a SATA power receptacle and a SATA data receptacle, a legacy Integrated Drive Electronics (IDE) power receptacle attached to the PCBA, and a connection-blocking device. The legacy IDE power receptacle is electrically common with the SATA power receptacle. Further, the connection-blocking device is attachable to either one of the SATA power receptacle or the legacy IDE power receptacle, respectively.

In one embodiment, the connection-blocking device may be formed out of an insulative material. Further, the insulative connection-blocking device may be sized to fit within one of a standards defined form factor for the legacy IDE power receptacle or a standards defined form factor for the SATA power receptacle, respectively. In one particular embodiment, the standards defined form factor for the legacy IDE power receptacle may be defined in accordance with the Small Form Factor (SFF)-8301 Specification for Form Factor of 3.5" disk drives. In another particular embodiment, the standards defined form factor for the SATA power receptacle may be defined in accordance with the Serial ATA: High Speed Serialized AT Attachment specification. Moreover, the insulative connection-blocking device may be designed to be either removable or non-removable after it has been attached. In some embodiments, the insulative connection-blocking device may be a label, an adhesive, or cardboard.

In another embodiment, the insulative connection-blocking device may be insert fitted into one of the legacy IDE power receptacle or the SATA power receptacle. The insulative connection-blocking device that is insert fitted into the legacy IDE power receptacle may be shaped to have the same approximate shape as the corresponding legacy IDE power receptacle, and when insert fitted therein, will make a compression fit and will be securely fixed therein. For example, the insulative connection-blocking device that is insert fitted into the legacy IDE power receptacle may be a plastic plug. Further, the plastic plug that is insert fitted into the legacy IDE power receptacle may have retention features that mate with complementary retention features of the legacy IDE power receptacle itself.

In a further embodiment, the insulative connection-blocking device that is insert fitted into the SATA power receptacle is shaped to have the same approximate shape as the corresponding SATA power receptacle, and when insert fitted therein, will make a compression fit and will be securely fixed therein. For example, the insulative connection-blocking device that is insert fitted into the SATA power receptacle may be a plastic plug.

In yet a further embodiment, the disk drive may include a user section receptacle, to which a second insulative connection-blocking device is also attachable. The second insulative connection-blocking device may be insert fitted into the user section receptacle. Further, the second insulative connection-blocking device may be shaped to have the same approximate shape as the user section receptacle, and when insert fitted therein, will make a compression fit and will be securely fixed therein. For example, the second insulative connection-blocking device may be a plastic plug.

In another aspect, the invention may be regarded as a disk drive having redundant data path connections, in which the disk drive includes a disk for rotation within the disk drive, a moveable head for writing and reading to and from the disk, a printed circuit board assembly (PCBA) for controlling operations in the disk drive, a Serial Advanced Technology Attachment (SATA) section attached to the PCBA having a SATA power receptacle, a primary data SATA receptacle, and a secondary data SATA receptacle, and a connection-blocking device. Particularly, the connection-blocking device is attachable the secondary data SATA receptacle.

In one embodiment, the connection-blocking device may be attachable to either one of the secondary data SATA receptacle or the secondary data SATA receptacle and the SATA power receptacle. Further, the connection-blocking device may be formed out of an insulative material. For example, the insulative connection-blocking device may be a label, an adhesive, or cardboard. In a particular embodiment, the insulative connection-blocking device may be insert fitted into one of the secondary data SATA receptacle or the secondary data SATA receptacle and the SATA power receptacle.

In one particular embodiment, the insulative connection-blocking device that is insert fitted into the secondary data SATA receptacle is shaped to have the same approximate shape as the corresponding secondary data SATA receptacle, and when insert fitted therein, will make a compression fit and will be securely fixed therein. In one example, the insulative connection-blocking device that is insert fitted into the secondary data SATA receptacle may be a plastic plug.

In a further embodiment, the insulative connection-blocking device that is insert fitted into the secondary data SATA receptacle and the SATA power receptacle is shaped to have the same approximate shape as the corresponding secondary data SATA receptacle and the SATA power receptacle, and when insert fitted therein, will make a compression fit and will be securely fixed therein. For example, the insulative connection-blocking device that is insert fitted into the secondary data SATA receptacle and the SATA power receptacle may be a plastic plug.

The foregoing and other features of the invention are described in detail below and set forth in the appended claims.

DETAILED DESCRIPTION

Figure 1A:
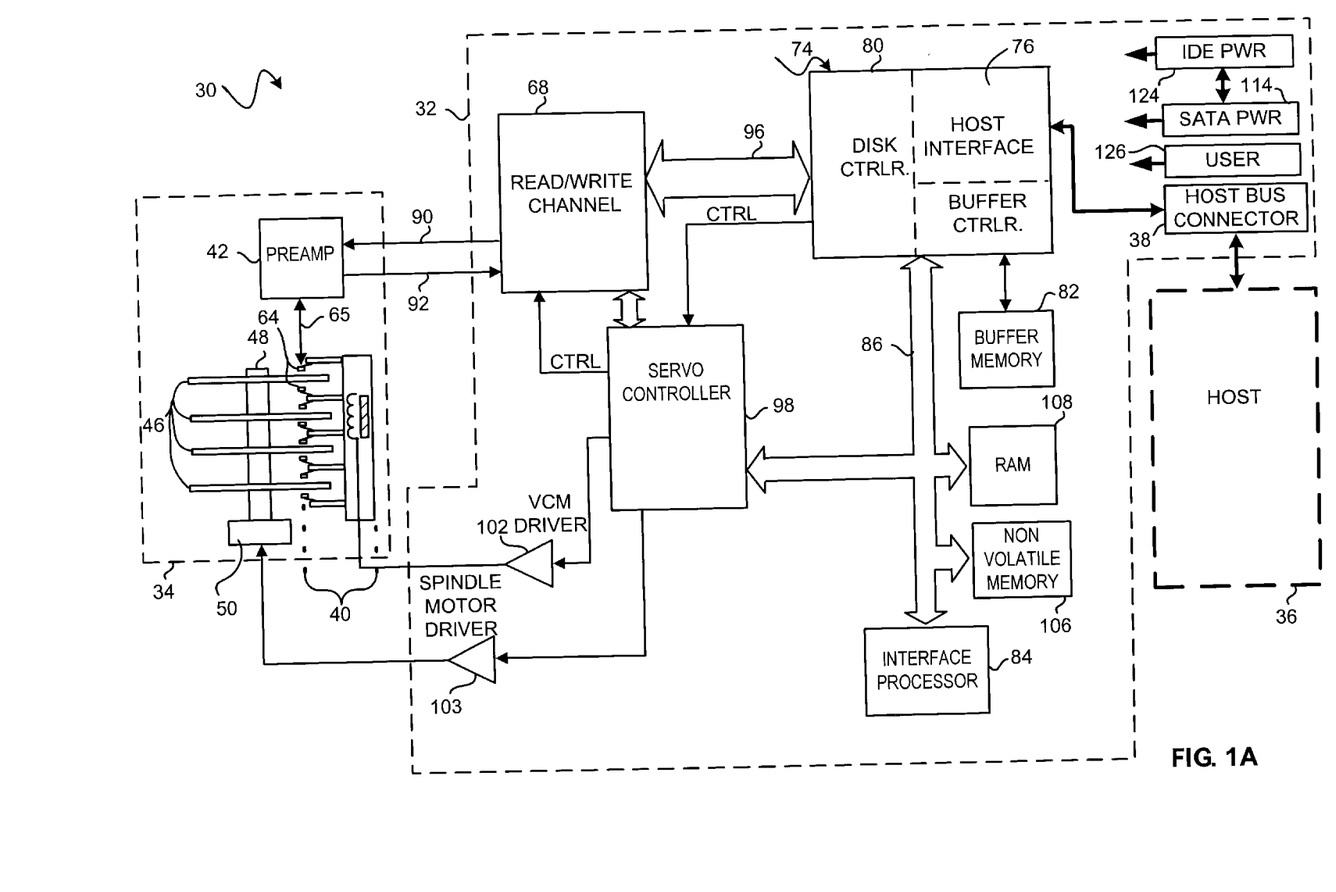
FIG. 1A shows a block diagram of a rotating media storage device (RMSD), such as a disk drive, in which embodiments of the invention may be practiced.

FIG. 1A shows a block diagram of a rotating media storage device (RMSD), such as disk drive 30, in which the invention may be practiced. Disk drive 30 is connected to a host computer 36 via host bus connector 38 for the transfer of commands, status and data. One suitable standard for such connection is the Serial Advanced Technology Attachment (SATA) standard presently favored for desktop personal computers.

Further, as shown in FIG. 1A, legacy Integrated Drive Electronics (IDE) power connections are made to the PCBA 32 through a legacy IDE power receptacle 124 connected to the PCBA 32, Serial Advanced Technology Attachment (SATA) power connections are made to the PCBA 32 through a SATA power receptacle 114 connected to the PCBA 32, and a user jumper input/output connections are made to the PCBA through a user receptacle 126 connected to the PCBA 32. Accordingly, redundant SATA and legacy IDE power connections may be made to the PCBA 32 of the disk drive 30. The legacy IDE power receptacle 124, SATA power receptacle 114, and the user receptacle 126 will be discussed in more detail later.

Disk drive 30 comprises a Head/Disk Assembly, HDA 34, and a controller printed circuit board assembly, PCBA 32. HDA 34 comprises: one or more disks 46 for data storage; a spindle motor 50 for rapidly spinning each disk 46 (four shown) on a spindle 48; and an actuator assembly 40 for moving a plurality of heads 64 in unison over each disk 46. The heads 64 are connected to a preamplifier 42 via a cable assembly 65 for reading and writing data on disks 46. Preamplifier 42 is connected to channel circuitry in controller PCBA 32 via read data line 92 and write data line 90.

Controller PCBA 32 comprises a read/write channel 68, servo controller 98, host interface and disk controller HIDC 74, voice coil motor driver VCM 102, spindle motor driver SMD 103, microprocessor 84, and several memory arrays— buffer or cache memory 82, RAM 108, and non-volatile memory 106.

Host initiated operations for reading and writing data in disk drive 30 are executed under control of microprocessor 84 connected to the controllers and memory arrays via a bus 86. Program code executed by microprocessor 84 is stored in non-volatile memory 106 and random access memory RAM 108. Program overlay code stored on reserved tracks of disks 46 may also be loaded into RAM 108 as required for execution. In particular, as described in detail below, microprocessor 84 under the control of a program or routine executes the method of the invention.

During disk read and write operations, data transferred by preamplifier 42 is encoded and decoded by read/write channel 68. During read operations, channel 68 decodes data into digital bits transferred on an NRZ bus 96 to HIDC 74. During write operations, HIDC provides digital data over the NRZ bus to channel 68 which encodes the data prior to its transmittal to preamplifier 42. Preferably, channel 68 employs PRML (partial response maximum likelihood) coding techniques, although the invention may be practiced with equal advantage using other coding processes.

HIDC 74 comprises a disk controller 80 for formatting and providing error detection and correction of disk data, a host interface controller 76 for responding to commands from host 36, and a buffer controller 78 for storing data which is transferred between disks 46 and host 36. Collectively the controllers in HIDC 74 provide automated functions which assist microprocessor 84 in controlling disk operations.

A servo controller 98 provides an interface between microprocessor 84 and actuator assembly 40 and spindle motor 50. Microprocessor 84 commands logic in servo controller 98 to position actuator 40 using a VCM driver 102 and to precisely control the rotation of spindle motor 50 with a spindle motor driver 103.

Preferably, disk drive 30 employs a sampled servo system in which equally spaced servo wedge sectors (sometimes termed "servo wedges") are recorded on each track of each disk 46. Data sectors are recorded in the intervals between servo sectors on each track. Servo sectors are sampled at regular intervals to provide servo position information to microprocessor 84. Servo sectors are received by channel 68, and are processed by servo controller 98 to provide position information to microprocessor 84 via bus 86.

Figure 1B:
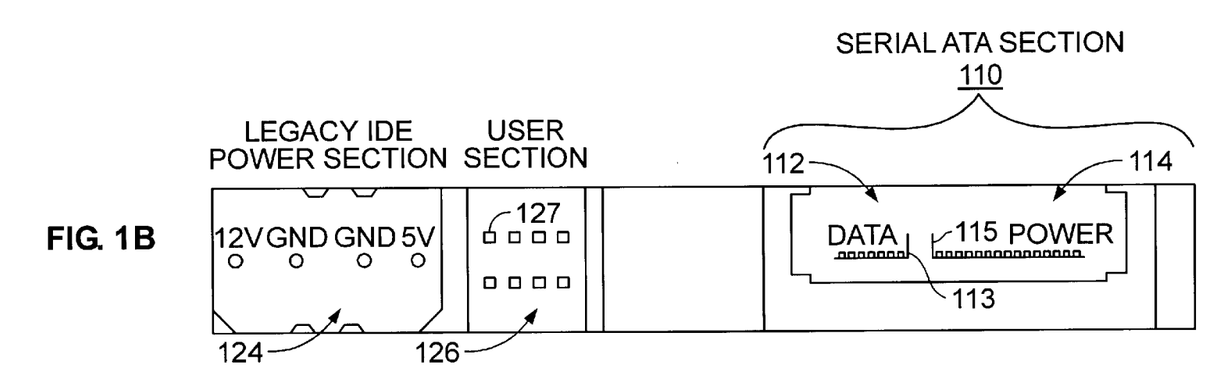
FIG. 1B shows an example of a Serial Advanced Technology Attachment (SATA) section and a legacy Integrated Drive Electronics (IDE) power receptacle, in which embodiments of the invention may be practiced.

Looking particularly at FIG. 1B, FIG. 1B illustrates an example a Serial Advanced Technology Attachment (SATA) section 110, as well as a legacy Integrated Drive Electronics power receptacle 124. The SATA section 110 includes a primary data SATA receptacle 112 and a SATA power receptacle 114.

The legacy IDE power section receptacle 124 includes 12 V and 5 V power pins and associated ground pins for connection with a host computer system that still utilizes the legacy IDE standard. Further, the 12 V and 5 V power pins and associated ground pins are connected to the printed circuit board assembly (PCBA) 32 for powering the disk drive 30.

The SATA section 110 includes a primary data SATA receptacle 112 having a L-shaped SATA data connector 113 including a plurality of primary data contact pins in accordance with the SATA standard. Further, the SATA section 110 includes a SATA power receptacle 114 having an L-shaped power connector 115 including a plurality of power contact pins in accordance with the SATA standard. Particularly, the power contact pins are connected to the PCBA 32 for powering the disk drive 30. Thus, both the SATA power receptacle 114 and the legacy IDE power section receptacle 124 provide redundant power connections to the PCBA 32 of the disk drive 30.

Further, a user section receptacle 126 includes a plurality of square pins 127 that are utilized to command the disk drive 30 to operate in a plurality of different modes and are often used in disk drive testing.

It should be appreciated that the SATA section 110 including the primary data SATA receptacle 112 and the SATA power receptacle 114, the legacy IDE power section receptacle 124, and the user section receptacle 126 may be designed as separate connectors, or as one integrated connector, depending upon the design considerations of the manufacturer. It should further be appreciated that this is only one example of a connector that implements the SATA standard and that a wide variety of different connectors implementing the SATA standard are possible. As previously discussed, a problem with connectors that implement the SATA standards, as well as the legacy standards, is that redundant power connections to the PCBA 32 of the disk drive 30 are simultaneously provided from both the legacy IDE power section receptacle 124 and the SATA power receptacle 114.

The present invention relates to a disk drive having a connection-blocking device for use with a SATA power receptacle that may be used to prevent redundant power connections from the SATA power receptacle 114 and the legacy IDE power section receptacle 124.

As previously discussed, the disk drive 30 includes a disk 46 for rotation within the disk drive 30, a movable head 64 for writing and reading to one from the disk 46, a PCBA 32 for controlling operations in the disk drive, a SATA section 110 attached to the PCBA 32 having a SATA power receptacle 114 and a SATA data receptacle 112, and a legacy IDE power section receptacle 124 attached to the PCBA. Both the SATA power receptacle 114 and the legacy IDE power section receptacle 124 provide redundant power connections to the PCBA 32 of the disk drive 30.

Figure 2A:
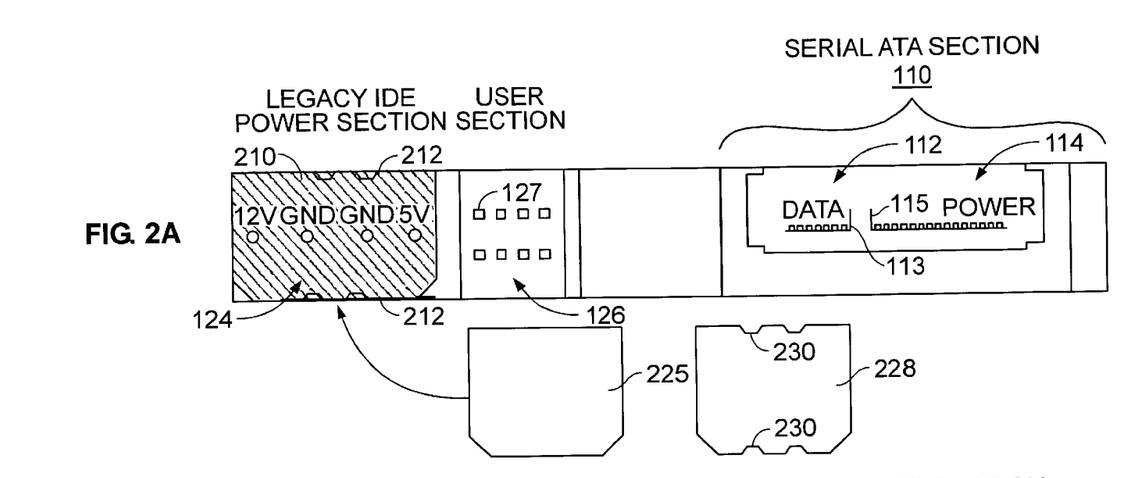
FIG. 2A shows a connection-blocking device that is attachable to the legacy IDE power receptacle, according to one embodiment of the invention.
Figure 2B:
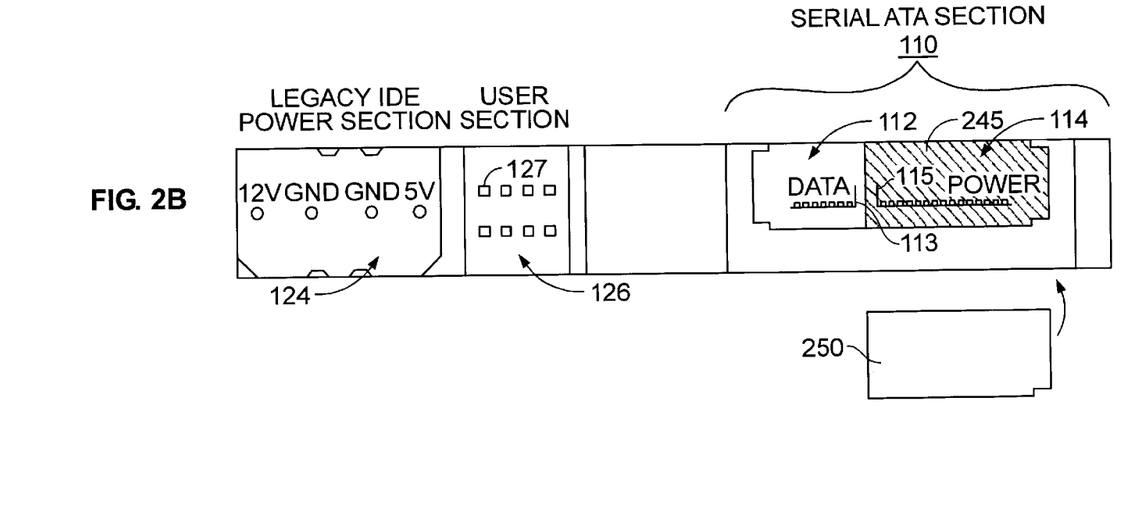
FIG. 2B shows a connection-blocking device that is attachable to the SATA power receptacle, according to one embodiment of the invention.

FIG. 2A shows a connection-blocking device 210 that is attachable to the legacy IDE power receptacle 124. FIG. 2B shows a connection-blocking device 245 that is attachable to the SATA power receptacle 114. Referring simultaneously to both FIGS. 2A and 2B, it can be seen that a connection-blocking device 210 or 245 is attachable to either one of the legacy IDE power section receptacle 124 or the SATA power receptacle 114, respectively, in order to prevent access to one of these power receptacles. Which power receptacle to block (i.e. either the legacy IDE power section receptacle or the SATA power receptacle) by the use of one of the connection-blocking devices 210 or 245 may be made, for example, by either the disk drive manufacturer or the original equipment manufacturer (OEM), and may be made depending upon which type of host system the disk drive is ultimately to be used in. Only one host system should be able to utilize the disk drive 30 at a given time, using either legacy IDE power standards or SATA power standards, and by using the connection-blocking devices redundant power connections to the disk drive can be avoided, as will be discussed.

For example, if a user of the disk drive made power connections to both the legacy IDE power pins of the legacy IDE power section receptacle 124 and the power contact pins of the SATA power receptacle 114, ground loops and noise may be introduced into the PCBA of the disk drive, and the disk drive may become non-functional. Moreover, without using a connection-blocking device 210 or 245, the power pins of either the SATA power receptacle or the legacy IDE power section receptacle could possibly short out to other metal structures in the computer system causing operational problems within the disk drive. Additionally, by blocking off power access by the use of one of the connection-blocking devices 210 or 245 from one of the non-utilized legacy IDE power section receptacle or SATA power receptacle, users are prevented from using these power sources to power other electronic devices thereby draining power from the disk drive.

Looking particularly at FIG. 2A, in one embodiment, the connection-blocking device 210 may be formed out of an insulative material. For example, the insulative connection-blocking device 210 may be a label, adhesive, cardboard, or any other type of insulative material to shield the power pins of the legacy IDE power section receptacle 124. Further, as shown in FIG. 2A, an insulative connection-blocking device 225 may be sized to fit within the legacy IDE power section receptacle 124. In one embodiment, the insulative connection-blocking device 225 may be insert fitted into the legacy IDE power section receptacle 124. Particularly, the insulative connection-blocking device 225 that is insert fitted into the legacy IDE power section receptacle 124 may be shaped to have the same approximate shape as the corresponding legacy IDE power receptacle 124, and when insert fitted therein, will make a compression fit and will be securely fixed therein. Moreover, the insulative connection-blocking device 225 may be designed to be either removable or non-removable after it has been attached. For example, the insulative connection-blocking device 225 may be designed to only be removable with the use of a tool (e.g. a screwdriver).

Further, the insulative connection-blocking device 225 may be sized to fit within one of the standards defined form factors for the legacy IDE power section receptacle 124. In one particular embodiment, the standards defined form factor may be defined in accordance with the Small Form Factor (SFF)-8301 Specification for Form Factor of 3.5" disk drives. In this way, the insulative connection-blocking device 225 will not protrude from the legacy IDE power section receptacle 124.

In one embodiment, the insulative connection-blocking device 225 that is insert fitted into the legacy IDE power receptacle 124 may be a plastic plug. The plastic plug 225 may have sidewalls or other retention features such that when it is insert fitted into the legacy IDE power section receptacle power 124 it will make a compression fit and will be securely fixed therein. Particularly, in one embodiment, a plastic plug 228 having retention features 230, such as shaped grooves in the plastic plug, that mate with complementary retention features 212, such as matching shaped detents of the legacy IDE power receptacle 124, may be used.

Looking particularly at FIG. 2B, a connection-blocking device 245 that is attachable to the SATA power receptacle 114 may be used. In one embodiment, the connection-blocking device 245 may be formed out of an insulative material. For example, the insulative connection-blocking device 245 may be a label, adhesive, cardboard, or any type of insulative material to shield the power contact pins of the SATA power receptacle 114. Further, as shown in FIG. 2B, an insulative connection-blocking device 250 may be sized to fit within the SATA power receptacle 114. In one embodiment, the insulative connection-blocking device 250 may be insert fitted into the SATA power receptacle 114. Particularly, the insulative connection-blocking device 250 that is insert fitted into the SATA power receptacle 114 may be shaped to have the same approximate shape as the corresponding SATA power receptacle 114, and when insert fitted therein, will make a compression fit and will be securely fixed therein. Moreover, the insulative connection-blocking device 250 may be designed to be either removable or non-removable after it has been attached. For example, the insulative connection-blocking device 250 may be designed to only be removable with the use of a tool (e.g. a screwdriver).

Further, the insulative connection-blocking device 250 may be sized to fit within one of the standards defined form factors for the SATA power receptacle 114. In one particular embodiment, the standards defined form factor may be defined in accordance with the Serial ATA: High Speed Serialized AT Attachment specification. In this way, the insulative connection-blocking device 250 will not protrude from the SATA power receptacle 114.

In one embodiment, the insulative connection-blocking device 250 that is insert fitted into the SATA power receptacle 114 may be a plastic plug. The plastic plug 250 may have sidewalls or other retention features such that when it is insert fitted into the SATA power receptacle 114 it will make a compression fit and will be securely fixed therein. Particularly, in one embodiment, a plastic plug 250 having retention features that mate with complementary retention features of the SATA power receptacle 114 may be used.

Figure 3A:
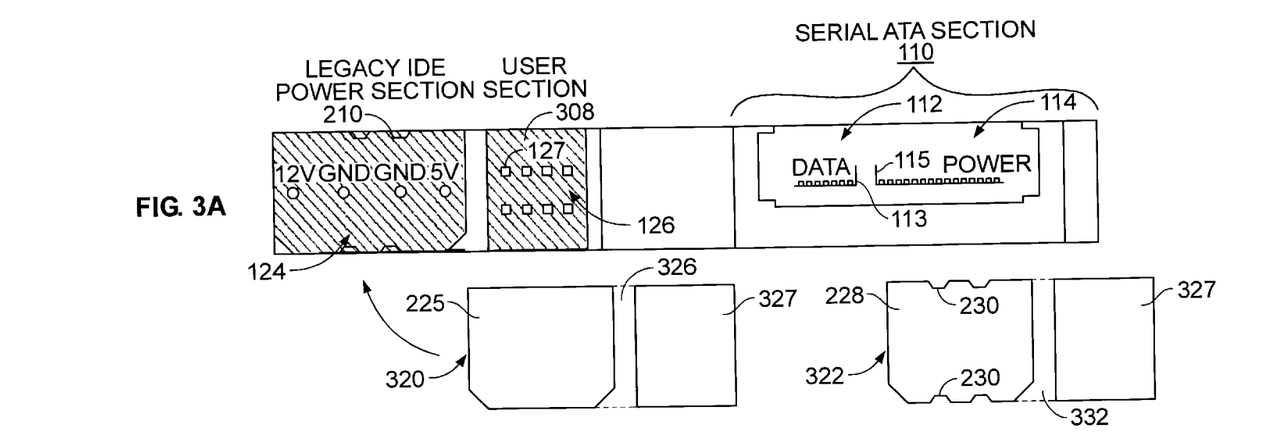
FIG. 3A shows a second insulative connection-blocking device that is attachable to the user section receptacle, in conjunction with the insulative connection-blocking device for the legacy IDE power receptacle, according to one embodiment of the invention.

With reference now to FIG. 3A, a second insulative connection-blocking device 308 may be attachable to the user section receptacle 126, in conjunction with the insulative connection-blocking device 210 for the legacy IDE power section receptacle 124. For example, in one embodiment, the second insulative connection-blocking device 308 may be a label, adhesive, cardboard, or any other type of insulative material to shield the user jumper pins of the user section receptacle 126. It should be appreciated that the second insulative connection-blocking device 308 may be a separate connection-blocking device or that both the first insulative connection-blocking device 210 and the second insulative connection-blocking device 308 may be formed as a single connection-blocking device. In any event, the first insulative connection-blocking device 210 has been previously discussed in detail.

As to the second insulative connection-blocking device 308 for the user section receptacle 126, the second insulative connection-blocking device 308 may be insert fitted into the user section receptacle 126. Further, as shown in FIG. 3A, the second insulative connection-blocking device 327 may be shaped to have the same approximate shape as the user section receptacle 126, and when insert fitted therein, will make a compression fit and will be securely fixed therein. Moreover, the second insulative connection-blocking device 327 may be designed to be either removable or non-removable after it has been attached. For example, the second insulative connection-blocking device 327 may be designed to only be removable with the use of a tool (e.g. a screwdriver). Furthermore, the second insulative connection-blocking device 327 may be sized to fit within one of the standards defined form factors for the user section receptacle.

In one embodiment, the second insulative connection-blocking device 327 that is insert fitted into the user section receptacle 126 may be a plastic plug. The plastic plug 327 may have sidewalls or other retention features such that when it is insert fitted into the user section receptacle 126 it will make a compression fit and will be securely fixed therein. Particularly, in one embodiment, the plastic plug 327 may have retention features that mate with complementary retention features of the user section receptacle 126.

Thus, as shown in FIG. 3A, a legacy IDE plastic plug 225 (previously discussed) may be inserted into the legacy IDE power section receptacle 124 and a separate user section plastic plug 327 may be inserted into the user section receptacle 126. Alternatively, a combined single unit plastic plug 320 including the legacy IDE plastic plug 225 and the user section plastic plug 327 may be used. In this case, the legacy IDE plastic plug 225 and the user section plastic plug 327 may be joined by a connection portion 326. In one embodiment, the connection portion 326 may fit into a recessed portion between the legacy IDE power section receptacle 124 and the user section receptacle 126. Also, another type of a combined single unit plastic plug 322 including the legacy IDE plastic plug 228 with retention features 230 (previously discussed) and the user section plastic plug 327 may be used. Again, as the previous case, the legacy IDE plastic plug 228 with retention features 230 may be joined by connection portion 332. Alternatively, the legacy IDE plastic plug 228 and the user section plastic plug 327 may be separate plastic plugs.

Figure 3B:
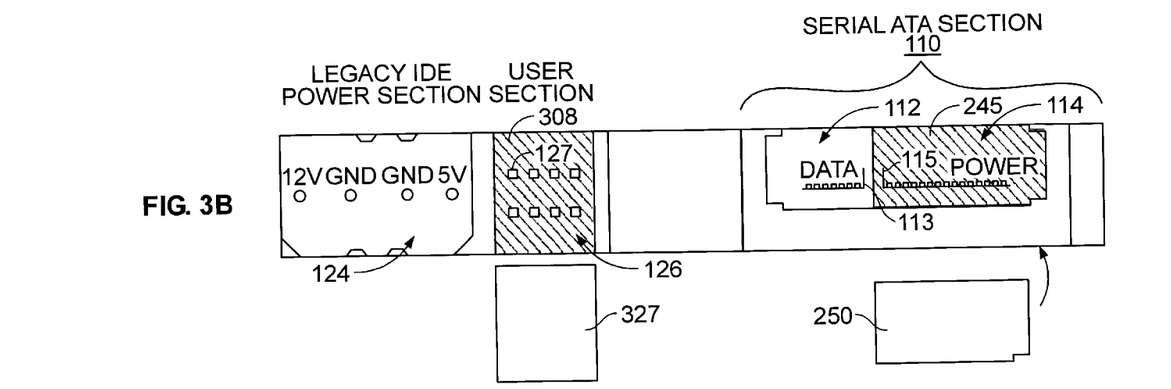
FIG. 3B shows a second insulative connection-blocking device that is attachable to the user section receptacle, in conjunction with the insulative connection-blocking device for the SATA power receptacle, according to one embodiment of the invention.

With reference now to FIG. 3B, the second insulative connection-blocking device 308 may be attachable to the user section receptacle 126, in conjunction with, the insulative connection-blocking device 245 for the SATA power receptacle 114. Both the second insulative connection-blocking device 308 for the user section receptacle 126 and the insulative connection-blocking device 245 for the SATA power receptacle 114, have both been previously discussed in detail, and discussions related thereto will not be repeated for brevity's sake. Also, as previously discussed with reference to FIG. 3A, the second insulative connection-blocking device 327 may be shaped to have the same approximate shape as the user section receptacle 126, and when insert fitted therein, will make a compression fit and will be securely fixed therein, and further in one embodiment, may be designed as a plastic plug 327. Again, both the shaped insulative connection-blocking device 250 (e.g. a plastic plug) that is insert fitted into the SATA power receptacle 114 and the shaped second insulative connection-blocking device 327 (e.g. a plastic plug) have both been previously discussed in detail, and discussions related thereto will not be repeated for brevity's sake.

As previously discussed, the user section receptacle 126 includes a plurality of square pins that are utilized to command the disk drive 30 to operate in a plurality of different modes and are often used in disk drive testing. By utilizing the second insulative connection-blocking device for the user section receptacle 126, either the disk drive manufacturer or the original equipment manufacturer (OEM) can prevent the ultimate user of the disk drive from operating the disk drive in these differing non-standard operating modes.

Figure 4:
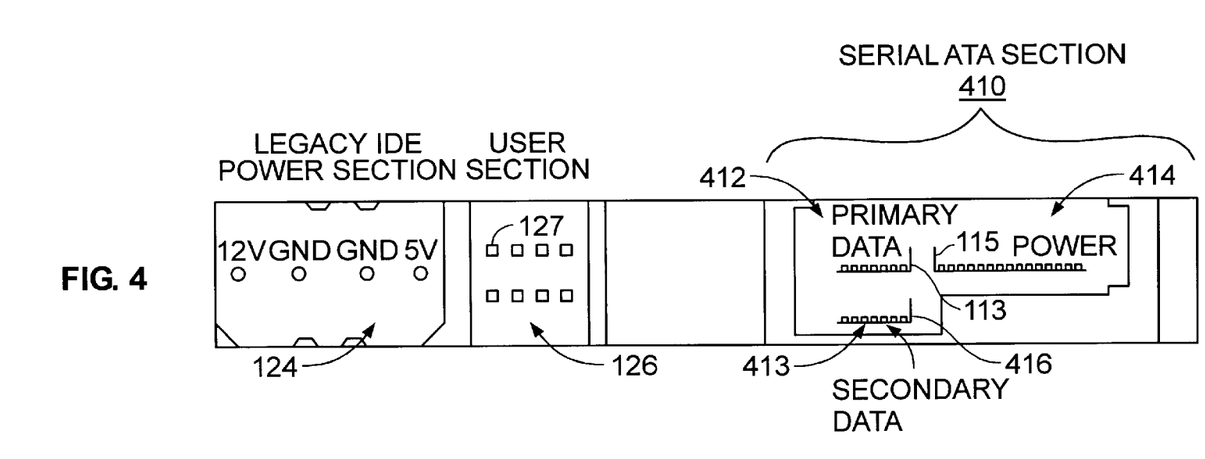
FIG. 4 shows a SATA section having redundant data path connections (e.g. a primary and secondary data SATA receptacle), in which embodiments of the invention may be practiced.

With reference now to FIG. 4, FIG. 4 shows a SATA section having redundant data path connections (e.g. a primary and secondary data SATA receptacle), in which embodiments of the invention may be practiced. Particularly, as shown in FIG. 4, the SATA section 410 includes the SATA power receptacle 414 (previously discussed), a primary data SATA receptacle 412, and a secondary data SATA receptacle 413. As previously discussed, the primary data SATA receptacle 412 has an L-shaped data connector 113 including a plurality of primary data contact pins in accordance with the SATA standard. Similarly, the secondary data SATA receptacle 413 has an L-shaped data connector 416 including a plurality of secondary data contact pins in accordance with the SATA standard. The secondary data SATA receptacle 413 provides a secondary data path to the disk drive. Accordingly, two host computers can be simultaneously connected to the disk drive (although only one of the computers can utilize the disk drive) through the primary and secondary data SATA receptacles, respectively, and if, for example, the host computer accessing the disk drive through the primary data SATA receptacle 412 fails, the other host computer can access the disk drive through the secondary data SATA receptacle 413. Particularly, in one embodiment of the invention, as will be discussed, a connection-blocking device may be attachable to either the secondary data SATA receptacle 413 or the secondary data SATA receptacle 413 and the SATA power receptacle 414.

Figure 5A:
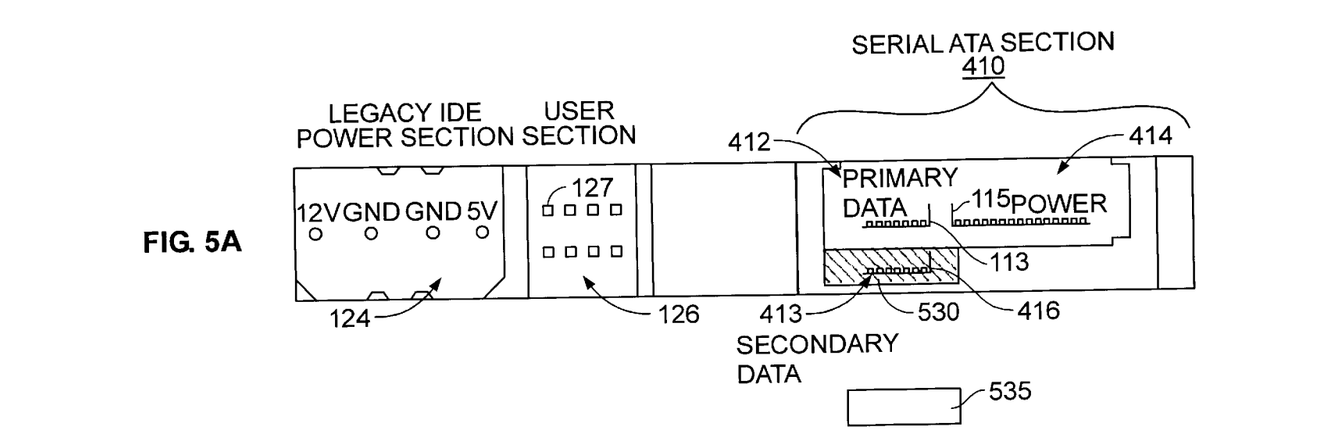
FIG. 5A shows a connection-blocking device that is attachable to the secondary data SATA receptacle, according to one embodiment of the invention.

Turning now to FIG. 5A, FIG. 5A shows a connection-blocking device 530 that is attachable to the secondary data SATA receptacle 413. In one embodiment, the connection-blocking device 530 may be formed out of an insulative material. For example, the insulative connection-blocking device 530 may be a label, adhesive, cardboard, or any other type of insulative material to shield the data contact pins of the secondary data SATA receptacle 413. Further, as shown in FIG. 5A, an insulative connection-blocking device 535 may be sized to fit within the secondary data SATA receptacle 413. In one embodiment, the insulative connection-blocking device 535 may be insert fitted into the secondary data SATA receptacle 413. Particularly, the insulative connection-blocking device 535 that is insert fitted into the secondary data SATA receptacle 413 may be shaped to have the same approximate shape as the corresponding secondary data SATA receptacle 413, and when insert fitted therein, will make a compression fit and will be securely fixed therein. Moreover, the insulative connection-blocking device 535 may be designed to be either removable or non-removable after it has been attached. For example, the insulative connection-blocking device 535 may be designed to only be removable with the use of a tool (e.g. a screwdriver).

Further, the insulative connection-blocking device 535 may be sized to fit within one of the standards defined form factors for the secondary data SATA receptacle 413. In one particular embodiment, the standards defined form factor may be defined in accordance with the Serial ATA: High Speed Serialized AT Attachment specification. In this way, the insulative connection-blocking device 535 will not protrude from the secondary data SATA receptacle 413.

In one embodiment, the insulative connection-blocking device 535 that is insert fitted into the secondary data SATA receptacle 413 may be a plastic plug. The plastic plug 535 may have sidewalls or other retention features such that when it is insert fitted into the secondary data SATA receptacle 413, it will make a compression fit and will be securely fixed therein. Particularly, in one embodiment, a plastic plug 535 having retention features that mate with complementary retention features of the secondary data SATA receptacle 413 may be used.

Figure 5B:
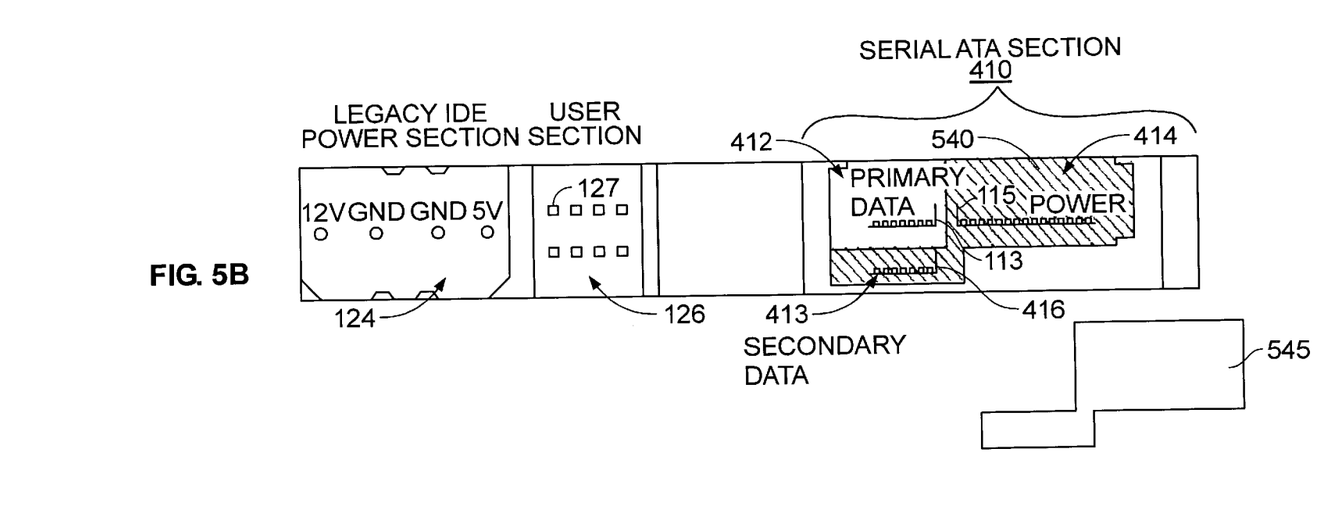
FIG. 5B shows a connection-blocking device that is attachable to the secondary data SATA receptacle and the SATA power receptacle, according to one embodiment of the invention.

Turning now to FIG. 5B, FIG. 5B shows a connection-blocking device 540 that is attachable to the secondary data SATA receptacle 413 and the SATA power receptacle 414. In one embodiment, the connection-blocking device 540 may be formed out of an insulative material. For example, the insulative connection-blocking device 540 may be a label, adhesive, cardboard, or any other type of insulative material to shield the data contact pins of the secondary data SATA receptacle 413 and the power contact pins of the SATA power receptacle 414. Further, as shown in FIG. 5B, an insulative connection-blocking device 545 may be sized to fit within both the secondary data SATA receptacle 413 and the SATA power receptacle 414, wherein as shown in FIG. 5B, the insulative connection-blocking device may be approximately S-shaped. In one embodiment, the insulative connection-blocking device 545 may be insert fitted into the secondary data SATA receptacle 413 and the SATA power receptacle 414. Particularly, the insulative connection-blocking device 545 that is insert fitted into the secondary data SATA receptacle 413 and the SATA power receptacle 414 may be shaped to have the same approximate shape as the corresponding the secondary data SATA receptacle 413 and the SATA power receptacle 414 (e.g. approximately S-shaped), and when insert fitted therein, will make a compression fit and will be securely fixed therein. Moreover, the insulative connection-blocking device 545 may be designed to be either removable or non-removable after it has been attached. For example, the insulative connection-blocking device 545 may be designed to only be removable with the use of a tool (e.g. a screwdriver).

Further, the insulative connection-blocking device 545 may be sized to fit within one of the standards defined form factors for the secondary data SATA receptacle 413 and the SATA power receptacle 414. In one particular embodiment, the standards defined form factors for the secondary data SATA receptacle 413 and the SATA power receptacle 414 may be defined in accordance with the Serial ATA: High Speed Serialized AT Attachment specification. In this way, the insulative connection-blocking device 545 will not protrude from the secondary data SATA receptacle 413 and the SATA power receptacle 414.

In one embodiment, the insulative connection-blocking device 545 that is insert fitted into the secondary data SATA receptacle 413 and the SATA power receptacle 414 may be a plastic plug (e.g. an approximately S-shaped plastic plug 545). The plastic plug 545 may have sidewalls or other retention features such that when it is insert fitted into the secondary data SATA receptacle 413 and the SATA power receptacle 414 it will make a compression fit and will be securely fixed therein. Particularly, in one embodiment, a plastic plug 545 having retention features that mate with complementary retention features of the secondary data SATA receptacle 413 and the SATA power receptacle 414 may be used.

An original equipment manufacturer (OEM) or disk drive manufacturer may wish to block access to the SATA power receptacle 414 to prevent redundant power connections, for all the reasons previously discussed. Further, an OEM or disk drive manufacturer may wish to provide an option of preventing a secondary data path to the disk drive through the secondary data SATA receptacle 413. For example, only a preferred host computer connection through the primary data SATA receptacle 412 to the disk drive may be desirable.

It should be appreciated by those skilled in the art that numerous alternative types of connection-blocking devices for differing types of receptacles for various types of disk drives can be employed. Further, although the embodiments have been described in the context of a disk drive complying with SATA standards, the invention can be employed in many different types of electronic devices.

We claim:

1. A disk drive having redundant power connections, the disk drive comprising:
   a disk for rotation within the disk drive;
   a moveable head for writing and reading data to and from the disk;
   a printed circuit board assembly (PCBA) for controlling operations in the disk drive;
   a Serial Advanced Technology Attachment (SATA) section attached to the PCBA having a SATA power receptacle and a SATA data receptacle;
   a legacy Integrated Drive Electronics (IDE) power receptacle attached to the PCBA, the legacy IDE power receptacle being electrically common with the SATA power receptacle; and
   a connection-blocking device attachable to one of the SATA power receptacle or the legacy IDE power receptacle.

2. The disk drive of claim 1, wherein the connection-blocking device is formed out of an insulative material.

3. The disk drive of claim 2, wherein the insulative connection-blocking device is sized to fit within one of a standards defined form factor for the legacy IDE power receptacle or a standards defined form factor for the SATA power receptacle, respectively.

4. The disk drive of claim 3, wherein the standards defined form factor for the legacy IDE power receptacle is defined in accordance with Small Form Factor (SFF)-8301 Specification for Form Factor of 3.5" disk drives.

5. The disk drive of claim 3, wherein the standards defined form factor for the SATA power receptacle is defined in accordance with Serial ATA: High Speed Serialized AT Attachment specification.

6. The disk drive of claim 2, further comprising a user section receptacle, wherein a second insulative connection-blocking device is also attachable to the user section receptacle.

7. The disk drive of claim 2, wherein the insulative connection-blocking device is removable after it is attached.

8. The disk drive of claim 2, wherein the insulative connection-blocking device is not removable after it is has been attached.

9. The disk drive of claim 2, wherein the insulative connection-blocking device is insert fitted into one of the legacy IDE power receptacle or the SATA power receptacle.

10. The disk drive of claim 9, further comprising a user section receptacle, wherein a second insulative connection-blocking device is insert fitted into the user section receptacle.

11. The disk drive of claim 10, wherein the second insulative connection-blocking device is shaped to have the same approximate shape as the user section receptacle, and when insert fitted therein is compression fitted and securely fixed therein.

12. The disk drive of claim 11, wherein the second insulative connection-blocking device is a plastic plug.

13. The disk drive of claim 9, wherein the insulative connection-blocking device that is insert fitted into the legacy IDE power receptacle is shaped to have the same approximate shape as the corresponding legacy IDE power receptacle, and when insert fitted therein makes a compression fit and is securely fixed therein.

14. The disk drive of claim 13, wherein the insulative connection-blocking device that is insert fitted into the legacy IDE power receptacle is a plastic plug.

15. The disk drive of claim 14, wherein the plastic plug that is insert fitted into the legacy IDE power receptacle has retention features that mate with complementary retention features of the legacy IDE power section receptacle.

16. The disk drive of claim 9, wherein the insulative connection-blocking device that is insert fitted into the SATA power receptacle is shaped to have the same approximate shape as the corresponding SATA power receptacle, and when insert fitted therein makes a compression fit and is securely fixed therein.

17. The disk drive of claim 16, wherein the insulative connection-blocking device that is insert fitted into the SATA power receptacle is a plastic plug.

18. The disk drive of claim 2, wherein the insulative connection-blocking device comprises a label.

19. The disk drive of claim 2, wherein the insulative connection-blocking device comprises an adhesive.

20. The disk drive of claim 2, wherein the insulative connection-blocking device comprises cardboard.

21. A disk drive having redundant data path connections, the disk drive comprising:
   a disk for rotation within the disk drive;
   a moveable head for writing and reading data to and from the disk;
   a printed circuit board assembly (PCBA) for controlling operations in the disk drive;
   a Serial Advanced Technology Attachment (SATA) section attached to the PCBA having a SATA power receptacle, a primary data SATA receptacle, and a secondary data SATA receptacle; and a connection-blocking device attachable to the secondary data SATA receptacle.

22. The disk drive of claim 21, wherein the connection-blocking device is attachable to one of the secondary data SATA receptacle or the secondary data SATA receptacle and the SATA power receptacle.

23. The disk drive of claim 22, wherein the connection-blocking device is formed out of an insulative material.

24. The disk drive of claim 23, wherein the insulative connection-blocking device is insert fitted into one of the secondary data SATA receptacle or the secondary data SATA receptacle and the SATA power receptacle.

25. The disk drive of claim 24, wherein the insulative connection-blocking device that is insert fitted into the secondary data SATA receptacle is shaped to have the same approximate shape as the corresponding secondary data SATA receptacle, and when insert fitted therein makes a compression fit and is securely fixed therein.

26. The disk drive of claim 25, wherein the insulative connection-blocking device that is insert fitted into secondary data SATA receptacle is a plastic plug.

27. The disk drive of claim 24, wherein the insulative connection-blocking device that is insert fitted into the secondary data SATA receptacle and the SATA power receptacle is shaped to have the same approximate shape as the corresponding secondary data SATA receptacle and the SATA power receptacle, and when insert fitted therein makes a compression fit and is securely fixed therein.

28. The disk drive of claim 27, wherein the insulative connection-blocking device that is insert fitted into the secondary data SATA receptacle and the SATA power receptacle is a plastic plug.

29. The disk drive of claim 23, wherein the insulative connection-blocking device comprises a label.

30. The disk drive of claim 23, wherein the insulative connection-blocking device comprises an adhesive.

31. The disk drive of claim 23, wherein the insulative connection-blocking device comprises cardboard.

* * * * *